(12) United States Patent
Lepage et al.

(10) Patent No.: US 9,658,082 B2
(45) Date of Patent: May 23, 2017

(54) METHOD OF DETERMINING THE INSTANTANEOUS ANGULAR POSITION OF A CRANKSHAFT TARGET OPTIMIZED FOR STARTING THE ENGINE

(71) Applicants: IFP Energies nouvelles, Rueil-Malmaison (FR); Scaleo Chip, Valbonne (FR)

(72) Inventors: Thierry Lepage, Feucherolles (FR); Farid Tahiri, LeCannet (FR)

(73) Assignees: IFP ENERGIES NOUVELLES, Rueil-Malmaison (FR); SILICON MOBILITY, Valbonne/Sophia-Antipolis (FR)

( * ) Notice: Subject to any disclaimer, the term of this patent is extended or adjusted under 35 U.S.C. 154(b) by 241 days.

(21) Appl. No.: 14/660,238

(22) Filed: Mar. 17, 2015

(65) Prior Publication Data

US 2015/0268063 A1    Sep. 24, 2015

(30) Foreign Application Priority Data

Mar. 21, 2014 (FR) ..................... 14 52384

(51) Int. Cl.
*G01M 15/00* (2006.01)
*G01D 5/14* (2006.01)
*F02D 41/00* (2006.01)
*F02D 41/06* (2006.01)

(52) U.S. Cl.
CPC ......... *G01D 5/142* (2013.01); *F02D 41/009* (2013.01); *F02D 41/065* (2013.01);
(Continued)

(58) Field of Classification Search
CPC .. F16C 41/007; F16C 2326/02; F16C 19/186; G01R 35/005; G01R 33/0017;
(Continued)

(56) References Cited

U.S. PATENT DOCUMENTS 4,235,101 A * 11/1980 Stadelmann .......... G01M 15/06
                                                                73/114.26
4,262,251 A *  4/1981 Fujishiro ................ F02P 17/02
                                                                324/166
(Continued)

FOREIGN PATENT DOCUMENTS

DE          4230616 A1    3/1994
DE         10237221 A1    3/2003
(Continued)

OTHER PUBLICATIONS

French Written Opinion dated Dec. 18, 2014.

*Primary Examiner* — Arleen M Vazquez
*Assistant Examiner* — Taqi Nasir
(74) *Attorney, Agent, or Firm* — Fitch, Even, Tabin & Flannery LLP

(57) ABSTRACT

A method for determining an absolute angular position of a crankshaft target of an internal combustion engine, including a plurality of teeth for which at least one signal is acquired representing the passage of each tooth in front of a sensor as a function of time comprising:

i. generating during a phase with the engine running an absolute angular position from the at least one signal and from a period of a tooth;

ii. continuously determining during a phase of stopping the engine when determination of the period is not possible, a number of teeth passing in front of the sensor; and iii. during a phase of restarting the engine, using a number of teeth to reduce the cycle synchronization time.

32 Claims, 7 Drawing Sheets

(52) U.S. Cl.
CPC ............... *F02D 2041/0092* (2013.01); *F02D 2041/0095* (2013.01); *F02D 2250/06* (2013.01)

(58) Field of Classification Search
CPC .. G01R 33/04; G01R 33/077; G01R 33/0029; G01R 33/0035; G01R 33/02; G01R 33/028; G01R 33/093; G01R 15/20; G01R 15/205; G01R 19/0092
USPC ........ 324/207.25, 173, 174, 207.2, 201–206, 324/200, 207.11–207.26, 331, 345, 381, 324/389, 210–219, 244–263; 348/448, 348/489, 544, 589
See application file for complete search history.

(56) References Cited

U.S. PATENT DOCUMENTS

| | | | | |
|---|---|---|---|---|
| 4,409,548 A | * | 10/1983 | Focht | F02D 41/009 310/339 |
| 4,782,692 A | * | 11/1988 | Peden | G01M 15/06 73/114.25 |
| 4,814,704 A | * | 3/1989 | Zerrien, Jr. | G01P 3/488 324/207.12 |
| 5,447,143 A | | 9/1995 | Ott et al. | |
| 6,172,500 B1 | * | 1/2001 | Bicking | F02D 41/009 123/406.58 |
| 6,208,131 B1 | * | 3/2001 | Cebis | F02D 41/009 123/406.58 |
| 6,499,342 B1 | | 12/2002 | Gonzales, Jr. | |
| 6,827,063 B2 | | 12/2004 | Breitegger et al. | |
| 7,257,480 B2 | | 8/2007 | Kassner | |
| 2003/0037607 A1 | * | 2/2003 | Minich | G01M 15/06 73/114.25 |

FOREIGN PATENT DOCUMENTS

| | | |
|---|---|---|
| DE | 102004049578 A1 | 4/2006 |
| FR | 2937684 A1 | 4/2010 |

* cited by examiner

METHOD OF DETERMINING THE INSTANTANEOUS ANGULAR POSITION OF A CRANKSHAFT TARGET OPTIMIZED FOR STARTING THE ENGINE

CROSS REFERENCE TO RELATED APPLICATION

Reference is made to French Application Serial No. 11/52.384, filed Mar. 21, 2014, which application is incorporated herein by reference in its entirety.

BACKGROUND OF THE INVENTION

Field of the Invention

The present invention relates to engine management and acquisition of data synchronously with the revolution of the engine crankshaft. The invention more particularly concerns the field of angular prediction methods enabling determination of the precise geometrical position of the crankshaft.

The invention may find applications in the research laboratories of engine manufacturers to assisting in the design of motor vehicle engine management systems. It may also be integrated into the engine management systems in a volume production vehicle Description of the Prior Art During the operating cycle of an internal combustion engine numerous actions must be synchronized to the geometrical position of the crankshaft. This applies to control of the injection of fuel, control of the spark plugs and management of the distribution units. Actuators such as fuel injectors and ignition coils must be controlled according to particular angular positions of the engine cycle.

The increasingly frequently adopted industrial use on volume production vehicles of processing algorithms for optimizing engine performance necessitates the acquisition of signals over precise angular windows as well as measuring the instantaneous speed of the engine. For example, it is necessary to know the angular position of the crankshaft and its instantaneous speed in the context of control systems enabling optimization of the operating point of an internal combustion engine by the processing in real time of meaningful parameters of its operation, such as the pressure in the various combustion chambers at a series of successive moments of each combustion cycle.

To perform these various actions, an engine is equipped with a computer that requires precise information of the position of the crankshaft. To satisfy these requirements, the crankshaft is equipped with a toothed wheel and with a sensor that detects the passage of the teeth with the objective of informing the processor responsible for controlling the control and/or command units of this. This toothed wheel is referred to as an "engine target".

The latter is a disk generally placed at the level of the engine flywheel. Teeth are machined on the periphery of this disk in a regular manner. To provide turn synchronization, it is common to create a space by eliminating one or more teeth. The teeth are referred to as "missing teeth". A target very often encountered in Europe has 58 teeth on its periphery. This in fact means regular machining of 60 teeth, each having a width of 6° V, and a space defined by the absence of two teeth. This topology is commonly referred to as 58X, or even 60-2.

To generalize, it may be considered that a crankshaft target may include a plurality of openings at its periphery. The interval between each opening is referred to as a sector. Each sector has a series of regular teeth followed by an opening of n teeth in width. The target may be expressed in the form: p*(m−n) with p being the number of sectors per engine turn where the geometry (m−n) is defined m being the number of regular teeth that the sector would include with no opening n being the number of missing teeth on the sector (size of the opening)

To return to the 58X target example, it is defined in the form "1*(60-2)".

However, to make use of an engine target, it must be possible to position a tooth numbered 1 with a perfectly known position, that is to say it must be possible, on the basis of the signal from the sensor, to determine the precise moment at which a particular tooth (tooth 1) passes in front of the sensor. The detection of the opening characterized, as described hereinabove, by the absence of one or more teeth enables an absolute reference to be obtained, thus indicating the precise position of the crankshaft. By definition, the tooth 1 may be set as that which follows the two missing teeth.

Engine targets are associated with a sensor which detects the passage of the teeth. The signal delivered by the sensor is an analog signal in the case of a variable-reluctance sensor and must be conditioned so that it can be used. The result of this conditioning is a signal (CS) in which a rising or falling edge reflects the middle of a tooth. In the case of a Hall-effect type sensor, the digital signal delivered may be used directly. It is precisely on the detection of this rising or falling edge that the processors base their synchronization of the operation of the engine.

Complementing information coming from an instrumented sensor on the crankshaft (AAC), the exact knowledge of the geometrical position of the crankshaft enables precise positioning over an engine cycle of the injection and/or ignition windows for each of the cylinders.

However, controlling the actuators of internal combustion engines necessitates an angular resolution of the order of 0.1°, and thus much higher than that obtained with the raw signal (CS) delivered by the crankshaft sensor (6° for a target of 1*(60-2) type).

To obtain high-resolution information as to the angular position of the crankshaft target, it is known to apply interpolation to the raw signal (CS) to increase the angular resolution.

The method employed uses a digital phase-locked loop (PLL) with an operating period programmed to be equal to the period of the tooth fraction to be generated. The latter is obtained by division of the period of a tooth that it is required to interpolate by the number of tooth fractions that it is required to generate. It is necessary to effect a fractional division and to manage the fractional parts through successive accumulation so as not to lose precision.

There is also known a method of determining the instantaneous angular position of a crankshaft target avoiding these problems, as for example the method described in French patent application No 13/61854. In this method, the angular resolution of the signal is increased by interpolation and a high-resolution signal is generated representing the passage of tooth fractions in front of the sensor as a function of time.

FIG. 1 shows the various phases of synchronization of such a system.

A) Tooth synchronization phase during which, three consecutive periods (teeth) are typically measured to be certain of not being on an opening B) Sector synchronization phase during which, detection of the opening is made
C) Cycle synchronization phase during which detection of a known profile on the camshaft target is made
D) System synchronized As this figure shows, the total duration of the synchronization phase depends on the number of crankshaft target sectors, the number of profiles that can be identified on the camshaft target and the stopped condition of the engine which is determined by the number of teeth between the stopped position and the first singularity of the crankshaft target. For a 58X target and a single crankshaft target, this can represent up to two engine revolutions.

The measurement of the period of the crankshaft teeth is the main information source of such a system. During the phase of stopping the engine, as the engine rpm decreases, the tooth period increases until it exceeds the measurement capabilities of the system, leading to desynchronization of the system and making complete synchronization obligatory each time the engine is started.

SUMMARY OF THE INVENTION

The invention is a method of determining the absolute angular position of a crankshaft target of an internal combustion engine enabling the problem desynchronization to be avoided. The method includes a step for optimizing the synchronization phase. To this end, the number of the tooth passing in front of the sensor is continuously determined during a phase of stopping the engine. This information is then used directly on starting to synchronize the system.

This step makes it possible to reduce significantly the duration of the synchronization phase. This can be an important factor for "Stop & Start" type applications for which rapid restarting of the engine is required, since they involve frequent phases of stopping and restarting the engine.

The invention is a method for determining the absolute angular position of a crankshaft target of an internal combustion engine with the target including a plurality of teeth, wherein a sensor acquires at least one signal representing the passage of each tooth in front of the sensor as a function of time, wherein:
  i. during a phase with the engine running:
    a period of a tooth is determined;
    the angular resolution of the signal is increased by generating over the period a high-resolution signal representing the passage of fractions of the tooth in front of the sensor as a function of time; and
    the absolute angular position is generated from the signal and from the period;
  ii. during a phase of stopping the engine, when determination of the period is no longer possible, the number of the tooth passing in front of the sensor is continuously determined; and
  iii. during a phase of restarting the engine, the tooth number is used to reduce the cycle synchronization time.

In the step i, the absolute angular position may be generated by carrying out the following steps:
  a. the position of at least one missing tooth on the target is determined from the high-resolution signal;
  b. the position of at least one sector is determined from the position of the missing tooth;
  c. among the sectors of the target, the sector in the position which has been determined as well as the revolution number of the cycle is determined by a synchronization mechanism using counters.

In the step I, the period of the tooth may be determined from a period of the preceding tooth or from an internal measurement or from information from an external device.

The number of the identified tooth may be initialized by determining the position of at least one missing tooth on the target from the high-resolution signal during a first phase of starting the engine.

In the step iii, the absolute angular position may be generated by carrying out the following steps:
  a effecting a tooth synchronization;
  b identify the sector and revolution number of the cycle from the number of the tooth identified in the step ii.

Before the step (a):
  the position of at least one missing tooth on the target may be determined from the high-resolution signal and a second tooth number deduced therefrom that is compared to the number of tooth identified in the step ii;
  if the tooth numbers are not identical, the second tooth number may be used, after which the value of the current tooth number is initialized.

A signal may additionally be used indicating the direction of rotation of the sensor to determine the number of the tooth passing in front of the sensor during the phase of stopping the engine.

The angular resolution of the signal may be increased by interpolating the signal over each tooth period by a Bresenham algorithm.

The acquired signal may be the signal measured in real time by a Hall-effect type crankshaft sensor.

BRIEF DESCRIPTION OF THE DRAWINGS

Other features and advantages of the method in accordance with the invention will become apparent on reading the following description of nonlimiting embodiments with reference to the appended figures described hereinafter.

The same references are used in each figure and throughout the description.

DETAILED DESCRIPTION OF THE INVENTION

Figure 2:
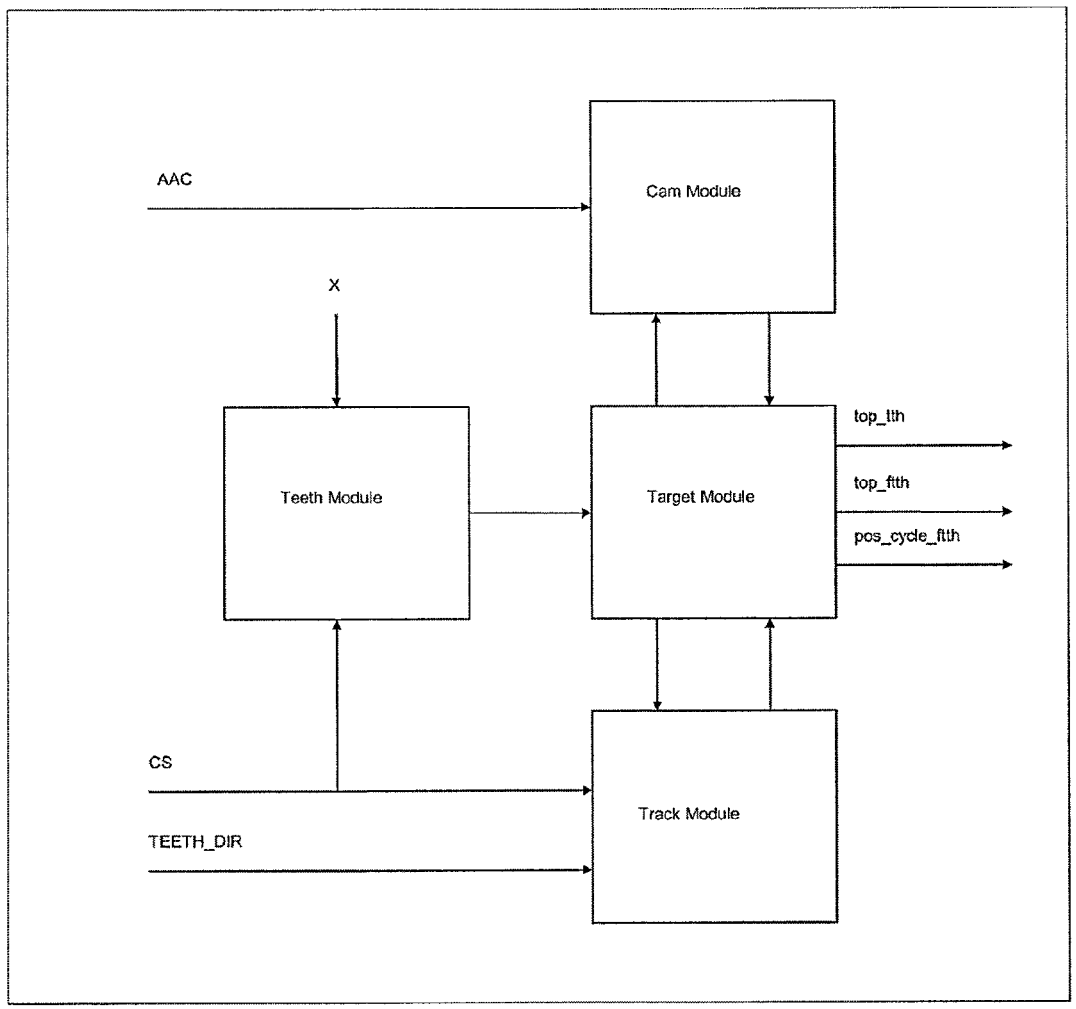
FIG. 2 shows a block diagram of the method in accordance with the invention.

Referring now to FIG. 2, which shows the method in accordance with the invention for determining the absolute angular position of a crankshaft target of an internal combustion engine with the target including a plurality of teeth. The instantaneous angular position referred to is the angle between a fixed marker on the crankshaft target (for example tooth no. 1) and a fixed marker off the target (crankshaft sensor), at a time t. This method includes the following steps:

1. using a sensor to acquire at least one raw signal representing the passage of each tooth in front of the sensor as a function of time;
2. determining the absolute angular position of the target during a phase of operation of the engine;
3. continuously determining the number of the tooth passing in front of the sensor during a phase of stopping the engine; and
4. determining the absolute angular position of the target during a phase of restarting the engine.

1. Acquisition of a Raw Signal from a Tooth Passage Sensor

During this step, at least one signal (CS) representing the passage of each tooth in front of the sensor as a function of time is acquired in real time by a sensor.

To this end, it is common to employ information coming from a sensor placed on the motor flywheel referred to as the crankshaft sensor. The term crankshaft signal refers to the signal obtained from the output of a crankshaft sensor and generated by the passage of the teeth of the crankshaft target in front of this sensor.

The crankshaft sensor is generally of the variable reluctance or Hall effect type. It is placed in the vicinity of a crankshaft target to track the evolution.

Figure 3A:
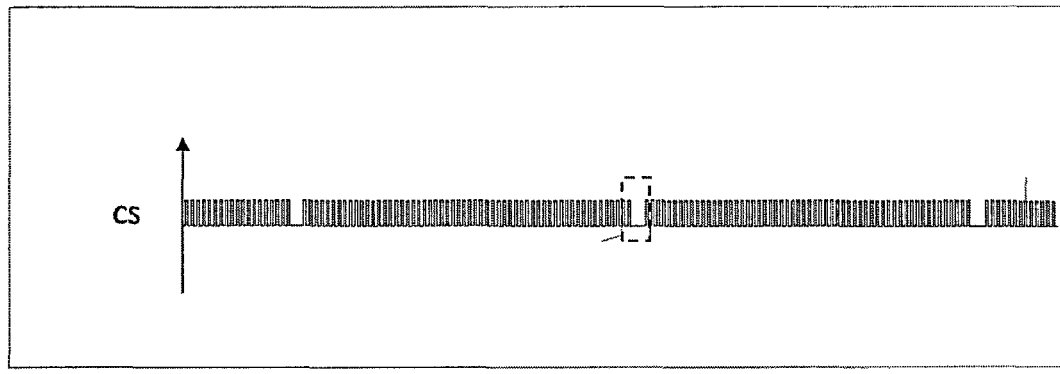
FIG. 3A shows the crankshaft signal obtained from the output of a crankshaft sensor for a 58X target (the abscissa axis representing time and the ordinate axis representing the amplitude of the signal from the sensor).
Figure 3B:
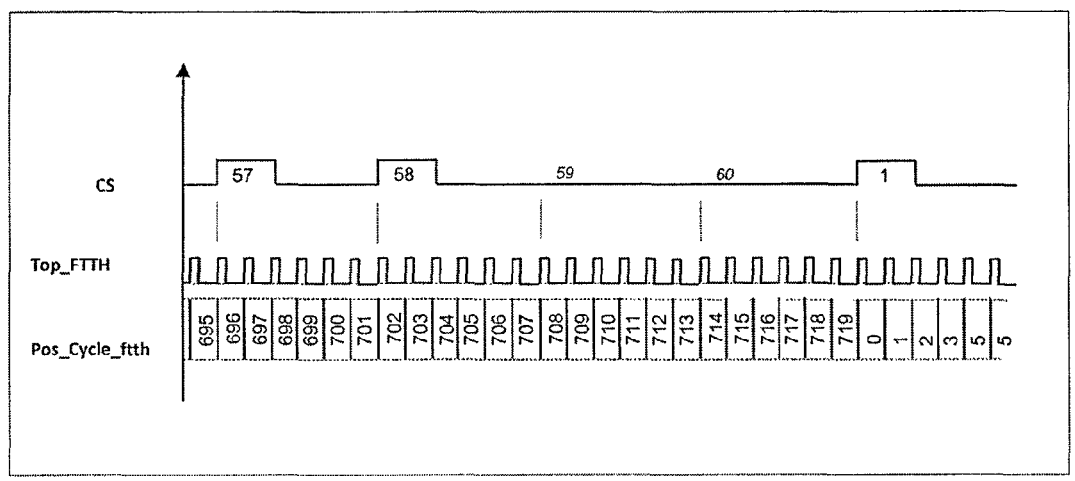
FIG. 3B is an enlargement of the dashed-line rectangle from FIG. 3A and additionally shows a high-resolution signal (TOP_FTTH) and the instantaneous angular position (POS_CYCLE_FTTH) in the form of an angle between 0 and 719°. A high-resolution signal resolution of 1° has been set in order to render the figure legible.

The signal (CS) coming from such a sensor is represented in FIGS. 3A and 3B, in the case of a 58X target. A rising or falling edge of the crankshaft signal is the reflection of a tooth. It is precisely on the detection of this rising or falling edge that the processors base their synchronization of the operation of the engine. The first rising edge that follows the opening therefore indicates the middle of the first tooth (tooth numbered 1) for a variable-reluctance sensor or the beginning of the first tooth (tooth numbered 1) for a Hall-effect type sensor of the crankshaft target. The second edge naturally corresponds to the second tooth and so on up to the 58th tooth.

2. Determination of the Absolute Angular Position of the Target During a Phase of Operation of the Engine This step is carried out when the motor is running, that is to say exclusive of the phases of stopping and the phases of restarting.

This step includes the following steps:
  determining a period of a tooth;
  increasing the angular resolution of the signal by generating over the period a high-resolution signal representing the passage of fractions of the tooth in front of the sensor as a function of time; and
  generation of the absolute angular position from the signal and from the period.

Referring to FIG. 2, this step may be carried out by at least three modules:

A module named "Teeth_Module" for filtering the crankshaft signal, measuring the period of the teeth, generating a high-resolution signal representing each tooth fraction and detecting missing teeth and indirectly detecting the singularity.

A module named "Target_Module" for reconstructing the absolute angular position of the crankshaft target as a function of the mechanical parameters thereof. It relies for this on information coming from the module named "Teeth_Module" and cycle synchronization information coming from the module named "Cam_Module". The latter information can also come from a dedicated algorithm if the engine has no camshaft.

A module named "Cam_Module" for identifying particular profiles of the camshaft signal over angular windows of the sector of the crankshaft target to transmit synchronization information to the module named "Target_Module".

Figure 4:
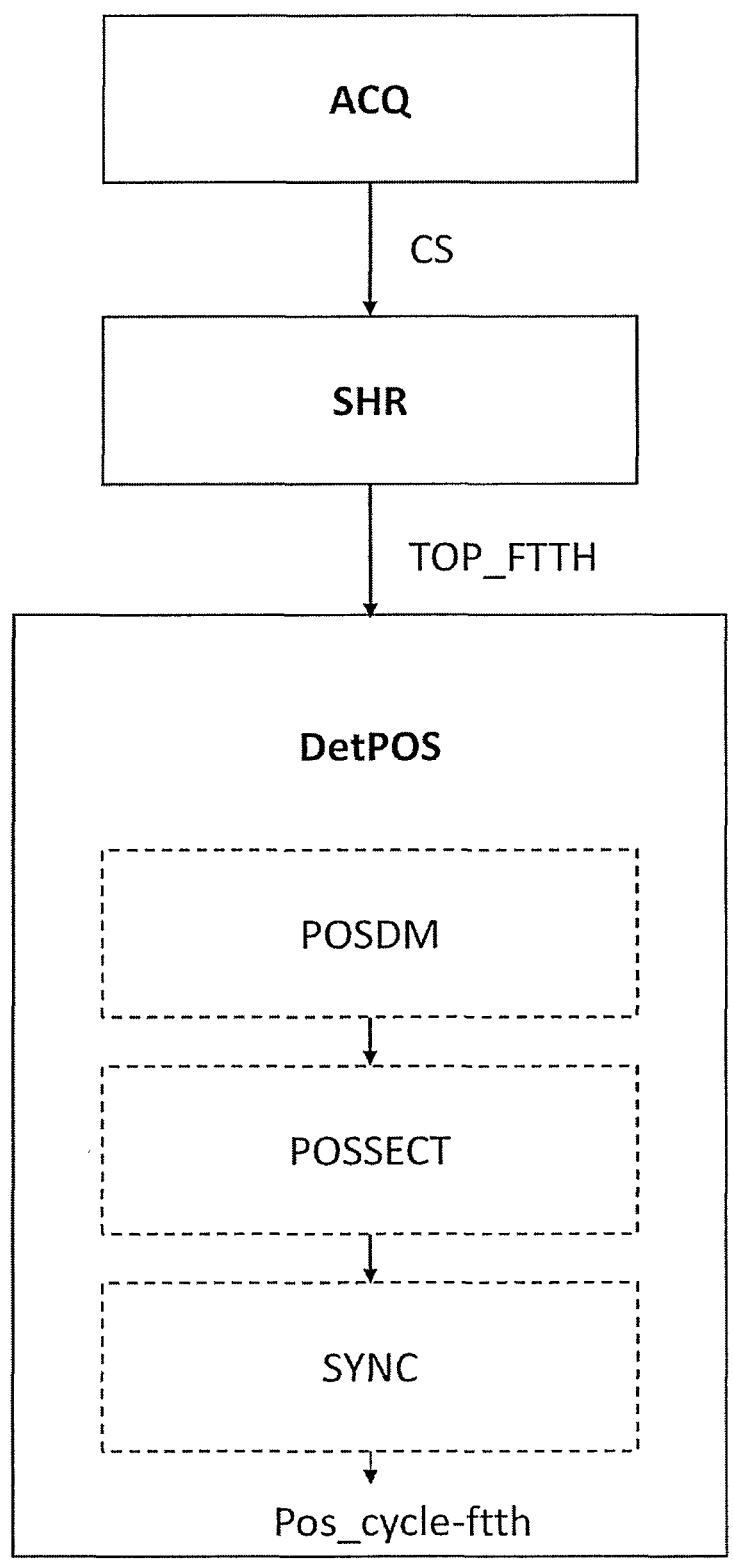
FIG. 4 shows the method for determining the instantaneous angular position of a crankshaft target of an internal combustion engine.

An example of a method for carrying out this step 2 of the method in accordance with the invention is described hereinafter with reference to FIG. 4.

Increasing the Angular Resolution of the Raw Signal (SHR)

During this step, the angular resolution of the raw signal (CS) is increased.

To this end, the raw signal (CS) is interpolated over each tooth period by the Bresenham algorithm. The expression tooth period (or tooth duration) refers to the time interval between the detection of two consecutive teeth.

In this way there is generated by interpolation a high-resolution signal (TOP_FTTH) representing the passage of teeth fractions in front of the sensor as a function of time. A tooth fraction is represented by the period of a pulse of the high-resolution signal obtained from the crankshaft signal.

On the basis of information on the period of the tooth concerned, the goal is to generate events corresponding to teeth fractions (ftth). The number of tooth fractions to be generated per tooth period constitutes a parameter defining the required resolution for the high-resolution signal.

The number of fractions therefore makes it possible to adjust the resolution as a function of the profile of the crankshaft target. For example, for a 1*(60-2) target, the choice may be made to generate 60 tooth fractions per tooth to have a resolution of 0.1°.

The source of the period information may stem directly from the measurement of the period of the preceding tooth or be the result of a calculation for correcting defects in the machining of the teeth or acyclism of the engine.

To generate a high-resolution signal representative of tooth fractions (ftth), pulses are generated from the raw signal for each tooth fraction (see FIG. 3B).

The Bresenham algorithm is used for this purpose; it was originally used to trace straight line segments on the screen of a computer or a computed image for printing.

After a few optimization steps in order to eliminate fractional numbers that are difficult to process in a simple manner, the process becomes:

Initial conditions: y=0; error=−X
for each increment along the x axis
  error=error+2*Y
  if error >0 then
  y=y+1
  error=error−2X
  end if
end for Y pulses representative of tooth fractions during the period X are generated by setting X, the period of the tooth over which to generate the tooth fractions, and Y, the number of tooth fractions to be generated, and by applying this algorithm.

An advantage of this algorithm is to be able to generate a high-resolution signal using few resources of programmable logic, an ASIC or an SoC.

The period X of the tooth n can be determined from the period of the preceding tooth n−1 or from an internal measurement or from information coming from an internal device.

Determination (DetPOS) of the Instantaneous Angular Position of the Target

This step is performed by the module named "Target_Module".

During this step, the instantaneous angular position (POS_CYCLE_FTTH) of the target is determined by the high-resolution signal (TOP_FTTH).

Initially, to determine the angular position of the crankshaft target, at least one missing tooth is detected (POSDM).

To do this, the number of pulses generated since the last detection of teeth is counted, and a number of pulses threshold is set.

Thus if the number of pulses generated since the last detection of teeth is greater than a given threshold, then a missing tooth is detected.

Thanks to the high-resolution signal (TOP_FTTH) generated in this way, the width of the current tooth can be tracked. In fact, pulses are generated in a regular manner on the basis of the period of the tooth (X).

At the start of each tooth, a first downcounter (dcnt_iftth) is loaded with the number of tooth fractions to be generated. During tooth n+1, pulses are generated using the period measured for the tooth n. If the engine speed is constant and perfectly regular, the downcounter reaches 0 at the moment the new tooth is detected.

In the event of deceleration or acceleration, the period of the tooth n+1 is different from that of the tooth n (greater than it in the case of deceleration, less than it in the case of acceleration). In these cases, the downcounter does not reach 0. For an acceleration, the value of the downcounter is positive. For a deceleration, it is negative (the downcounter being signed, it is able to process negative numbers).

Figure 5:
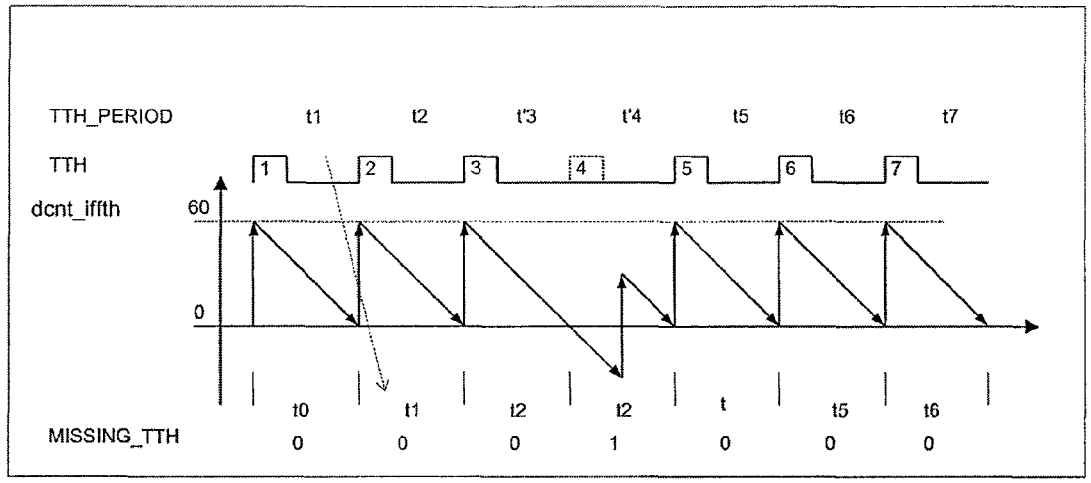
FIG. 5 shows the principle of detecting a missing tooth.

FIG. 5 shows the principle of detecting a missing tooth. The top line shows the position of the teeth (TTH). The next line indicates the value of the downcounter (dcnt_iftth), from 0 to 60 tooth fractions, as a function of time. The bottom line indicates the presence (1) or absence (0) of a missing tooth (MISSING_TTH). In principle, the downcounter (dcnt_iftth) continues to be decremented until a new tooth is detected. On the edge of the tooth no. 3, the module starts the generation of tooth fractions taking as a reference the last period measured: the period t2. At the end of this time, and failing detection bf tooth no. 4, the downcounter continues to be decremented. The value supplied by this downcounter is tracked, and when this value reaches a threshold (missing_tth_thr) that may be set to the negative equivalent of one half-tooth, it is considered to be in the presence of a missing tooth. The downcounter (dcnt_iftth) is reloaded with the number of tooth fractions to be generated over a tooth, which renders the value of the latter positive. When tooth no. 5 is detected, the system returns to a normal cycle. The period t taken as a timebase is the average of t3' and t4'.

Figure 6:
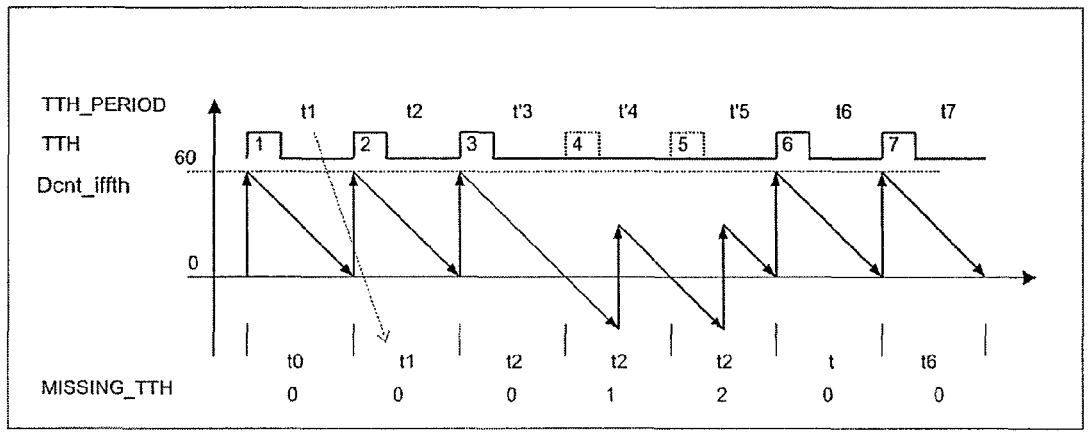
FIG. 6 shows the principle of detecting two missing teeth.
Figure 7:
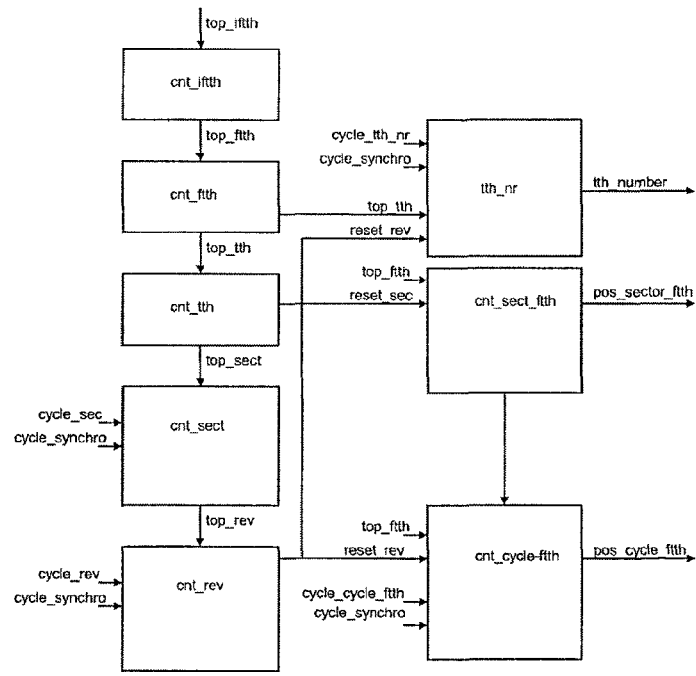
FIG. 7 shows in detail the target reconstruction module.

FIG. 6 shows the principle of detecting two missing teeth. The top line shows the position of the teeth (TTH). The next line indicates the value of the downcounter (dcnt_iftth), from 0 to 60 tooth fractions, as a function of time. The bottom line indicates the presence (1) or absence (0) of a missing tooth (MISSING_TTH). The mechanism for detecting the first missing tooth is similar to that described above. On the other hand, failing detecting of the tooth no. 5, and as for the first missing tooth, the downcounter (dcnt_iftth) continues to be decremented until it again reaches the threshold equivalent to one negative half-tooth. It is considered that we are in the presence of a new missing tooth and the downcounter (dcnt_iftth) is reloaded again. When tooth no. 6 is detected, the module returns to a normal cycle. The period t taken as a timebase is the average of the pseudo-periods t3', t4' and t5'.

This mechanism can therefore detect other consecutive missing teeth.

The method is therefore capable of detecting a series of missing teeth. By comparing an internal missing tooth counter to a defined parameter, it is easy to signal the detection of the opening. This mechanism can also detect any missing tooth or group of missing teeth. The cause of the teeth being missing possibly being voluntary: elimination of one or more teeth on the target defining an opening used to identify the first tooth (tooth1), or involuntary: loss of the signal over at least one tooth caused by a fault affecting the measurement system (target, sensor, shaping).

It is common to mask the crankshaft signal for a certain time to provide protection against external interference. In particular, in the case of variable-reluctance sensors, spurious detection can occur on the other edge of the signal. With the method, the masking time is simply generated by a comparator placed at the output of the downcounter (dcnt_iftth).

To obtain an absolute position, the engine cycle is reconstructed from the high-resolution signal (TOP_FTTH). To do this, and when the target has m teeth and n openings, the interval between two openings defining a sector, the following steps are performed:
i. the position of at least one missing tooth on the target is determined on the basis of the high-resolution signal (POSDM);
ii. the position of at least one sector is determined on the basis of the position of this missing tooth (POSSECT);
iii. the sector the position of which, together with the revolution number of the cycle, have been determined is identified among the n sectors by a synchronization mechanism (SYNC). This mechanism is able to use the signal from a sensor placed on one of the camshafts.

Synchronization of the angular position over the engine cycle includes the following steps (FIG. 1):
i. Tooth Synchronization As soon as the engine begins to rotate, the period of each tooth (TTH_PERIOD) is measured. In order to reject the probability of "falling" on an opening (SING) during this step, account is taken of a plurality of consecutive periods. Then at least one opening (SING) is detected, that is to say one or more missing teeth.
ii. Sector Synchronization The opening is characterized by a longer period between two consecutive teeth (typically three times longer when there are two missing teeth). Once the singularity has been detected, information is available as to the angular position of a sector, but if the cycle comprises a plurality of sectors, which is generally the case, the current sector is not known. At this stage, it is possible to provide valid "sector_pos"

information representing the absolute angular position of the engine over a sector. This information can be used to detect the camshaft (AAC) target.

iii. Cycle Synchronization

Cycle synchronization identifies the current sector number and revolution number. This requires additional information coming from camshaft detection or a software command if the engine is not equipped with any camshaft sensor. Following cycle synchronization, it is possible to supply valid "cycle_pos" information representing the absolute angular position of the engine over a cycle.

Figure 1:
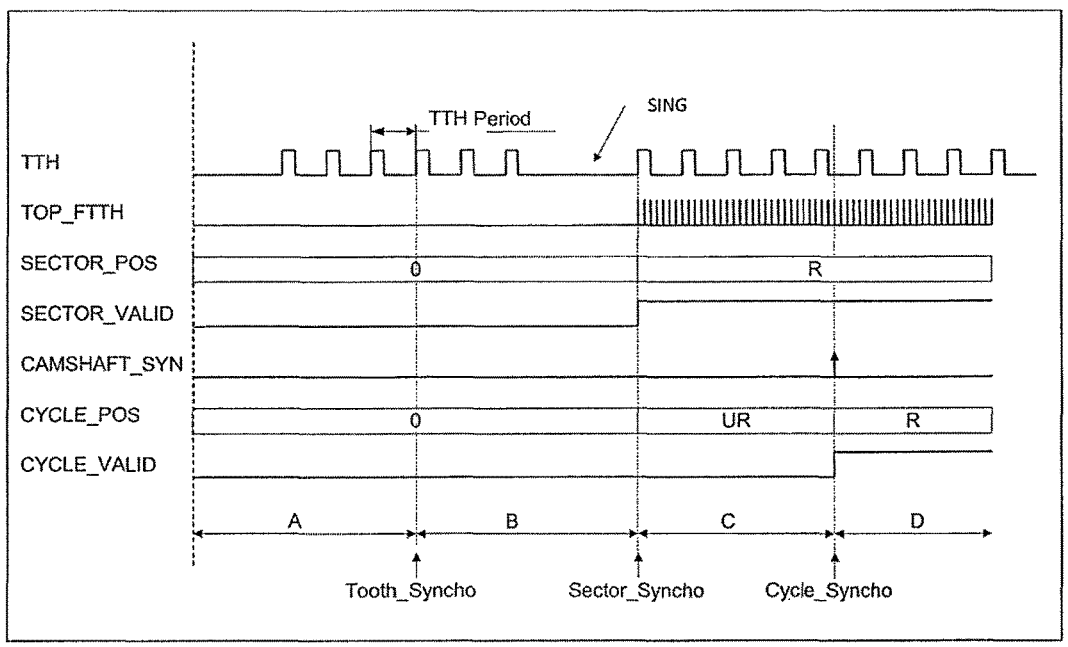
FIG. 1 shows the various synchronization steps of a prior art method.

FIG. 1 shows the various synchronization steps:
- A is tooth synchronization phase (Tooth_Syncho)
- B is sector synchronization phase (Sector_Syncho)
- C is cycle synchronization phase (Cycle_Syncho)
- D is system synchronized There are represented in FIG. 1 from the top down:
- TTH which is the position of the teeth of the target.
- TOP_FTTH which is the high-resolution signal generated in accordance with the invention.
- SECTOR_POS which is the angular position over a sector.
- SECTOR_VALID is a signal indicating to other modules that the signal SECTOR_POS is valid and therefore usable.
- CAMSHAFT_SYN is a signal symbolizing the cycle synchronization instant.
- CYCLE_POS is the angular position over the cycle.
- CYCLE_VALID is a signal indicating to other modules that the signal
- CYCLE_POS is valid and therefore usable.

The symbol R signifies "representative" and therefore that the signal is usable by other modules. The symbol NR signifies "unrepresentative" and therefore that the signal is not usable.

The engine cycle is reconstructed by a cascade of counters each managing one element of the cycle. An engine cycle is a number of engine revolutions, each having a number of sectors, each having a number of teeth, each having a number of tooth fractions and each having a number of tooth sub-fractions.

All these counters are forced to their initial conditions if the first opening has not been detected during the sector synchronization phase, the opening being detected on detection of the edge of the first tooth that follows the opening. This edge serves as an absolute reference for the angular position (the 0 of the angular position).

FIG. 7 shows:

A counter "cnt_iffth" which is incremented on each pulse "top_iftth" delivered by the block "iftth_gen". Modulo the interpolated value of ftth, the counter delivers a pulse "top_ftth".

A counter "cnt_ftth" is incremented every "top_ftth". Modulo nb_ftth_per_tth (number of tooth fractions per tooth), the counter delivers a pulse "top-tth" every tooth.

A counter "cnt_tth" is incremented every "top_tth". Modulo nb_tth_per_sec (number of teeth per sector), the counter delivers a pulse "top_sec" every sector.

A counter "cnt_sect" is incremented every "top_sec". Modulo "nb_se_per_rev", the counter delivers a pulse "top_rev" every engine revolution.

A counter "cnt_rev" is incremented every revolution. The counter manages the revolution number over the engine cycle.

A configuration linked to the type of engine (4-stroke/2-stroke) and the type of target (number of sectors per revolution, number of teeth per sector, number of tooth fractions per tooth) defines the incrementation limits of these counters. Their size is defined by the application range that is set at the level of the targets.

The counter "cnt_sec_ftth" is incremented on each event "top_ftth". The counter delivers the angular position of the engine over a sector. The counter is reset to zero on each event "top_sect".

The counter "cnt_cycle_ftth" is incremented on each event "top_ftth". The counter delivers the angular position of the engine over a complete cycle. The counter is reset to zero on each event "reset_rev" and its output represents the instantaneous absolute angular position of the engine.

The counter "tth_nr" is incremented on each event "top_tth". The counter delivers the number ("tth_number") of the tooth over a complete cycle and is reset to zero on each event "reset_rev".

Released at the moment of detection of the singularity, the counters "cnt_iftth", "cnt_ftth", "cnt_tth" and "cnt_sect_ftth" enable tracking of the angular position relative to a sector. This information, supplied directly by "cnt_sec_ftth", is used by a module (CAM) processing the camshaft signal with a view to delivering cycle synchronization.

Cycle synchronization applies to the counters "cnt_sect", "cnt_rev" and "cnt_cycle_ftth". The counter is signaled by a pulse "cycle_synchro" accompanied by variables for updating these counters (cycle_sec, cycle_rev, cycle_cycle_ftth). This information is generated by the module CAM following detection of a particular profile in the camshaft signal (signal AAC) enabling identification of the current sector number and revolution number. The principle of this identification process is described hereinafter.

To synchronize over an engine cycle comprising more than one sector, additional information is used. This information is three signals:
- a synchronization request signal,
- a signal indicating which revolution of the cycle to synchronize, and
- a signal indicating which sector to synchronize.

All of these signals can be supplied by a system using the signal AAC, such as the module CAM, or by some other system capable of supplying this information following analysis of particular phenomena over the engine cycle.

From the known position of the camshaft relative to the angular reference obtained from the crankshaft, and using the sector position ("pos_sector_ftth"), a (time or angular) analysis window is generated during which the goal is to identify a particular profile of the AAC signal. A profile enables unique identification over an engine cycle of the current position (sector and revolution).

A profile is a series of edges of the AAC signal. There are multiple detection parameters. For example, there may be a profile of the following type:
- series of n consecutive (rising or falling) edges with the first being a rising edge;
- series of n consecutive (rising or falling) edges with the first being a falling edge;
- a series of n rising edges;
- a series of n falling edges;
- a state of the signal during the window.

The parameters of a profile are as follows:
- detection type;
- number of edges expected in the window;
- type of the first edge or state of the expected signal;
- the sector number corresponding to the profile; and
- the revolution number corresponding to the profile.

As a function of how the crankshaft and camshaft targets are designed, it is possible to define a plurality of different profiles. Detection of one of the profiles during the analysis window leads to the generation of a synchronization request accompanied by angular position parameters (sector number and revolution number) of the profile concerned.

Figure 8:
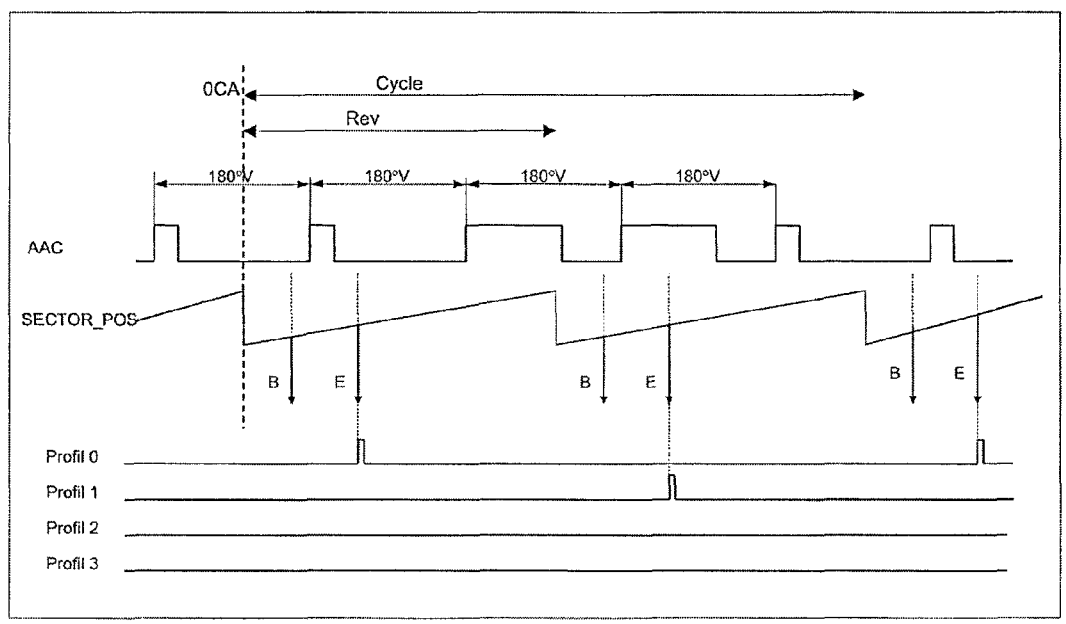
FIG. 8 shows the principle of synchronization to obtain the sector number and the revolution number in the particular case of an AAC signal.

FIG. 8 shows the principle of this operation, for a particular case of the ACC signal, assuming the presence of a crankshaft target having only one sector per engine revolution.

An analysis window is defined by its beginning (B) and its end (E) relative to the angular position of the sector.

The configuration of a first profile (profile 0) is of interest are all the edges of the signal with the first being a "rising edge" and there also being two edges during the window.

The configuration of a second profile (profile 1) is of interest are all the edges of the signal with the first being a "rising edge" and there also being one edge during the window.

Other available profiles are not used.

The detection of the profile 0 at the end of the first window and the detection of the profile 1 at the end of the second constitute two sources of information enabling the fastest possible synchronization of the complete system over one engine cycle.

3. Continuous Determination of the Number of the Tooth Passing in Front of the Sensor During a Phase of Stopping the Engine This step is represented in the drawings by the module named "Track_Module".

It is carried out during a phase of stopping the engine, when determination of the period is no longer possible. In fact, the measurement of the period of the crankshaft teeth is the main source of information for determining the angular position of a target. However, during the phase of stopping the engine, as the engine speed falls, the tooth period increases until it exceeds the measurement capabilities of the system, leading to desynchronization of the system and making complete synchronization each time the engine is started obligatory.

In accordance with the invention, during this phase, in which there is no value for the period of the teeth, the number ("Cur_tooth_num") of the tooth passing in front of the sensor is continuously determined by a Hall-effect type crankshaft sensor. This type of sensor is capable of detecting each tooth of the crankshaft target, even at very low rotation speeds. This makes it possible to track well the evolution of the angular position during stopping of the engine.

This step may be represented symbolically by a counter which, knowing the characteristics of the crankshaft target, counts the teeth that it detects and is capable of supplying the number of the current tooth.

Initialization of the Current Tooth Number

After powering up the ECU, it is necessary to initialize the current tooth number managed by the module named "Track_Module". To perform this initialization, two strategies may be used:
 reading in a non-volatile memory data that was saved before the previous power down;
 performing a first start using a standard synchronization and communicating to the module named "Track_Module" the tooth number onto which it is should lock.

The defect of the first strategy is to perform the first initialization (factory initialization) and that nothing guarantees that there is no engine rotation when the system is no longer powered up, in particular during mechanical maintenance work. The defect of the second strategy is that the first synchronization after powering up cannot be optimized. On the other hand, it is fully operational during frequent restarting for Stop&Start applications.

Accordingly, in accordance with the second strategy, on power up, the value of "Cur_tooth_Num" is not pertinent and the module named "Track_Module" is not able to supply complementary information to the module named "Target_Module". The system therefore passes through a complete synchronization phase. Once this has been done, the module named "Target_Module" initializes the value "Cur_tooth_num" of the module named "Track_Module". This initialization may be performed once only or in a regular manner for as long as the module named "Target_Module" considers that it is operational.

This regular updating makes it possible to guarantee that the two modules are in phase.

To manage the situation in which the engine is turning in the opposite direction when, practically stopped, it reaches a cylinder compression point that tends to cause it to turn in the opposite direction, a mechanical brake mechanism may be used that operates on the engine flywheel during the phase of stopping the engine. This makes it possible to guarantee that the engine will not turn in the opposite direction. In this case, the module named "Track_Module" can function with a standard Hall-effect type sensor.

However, some original equipment manufacturers are starting to offer sensors supplying information as to the direction of rotation of the engine in addition to the "tooth" information.

Accordingly, in accordance with one embodiment, a signal (TEETH_DIR) indicating the direction of rotation of the sensor is additionally used for determining the number of the tooth passing in front of the sensor during the phase of stopping the engine.

A bidirectional crankshaft sensor may be used for this. This type of sensor is capable of detecting each tooth of the crankshaft target, even at very low rotation speeds, but also of indicating the direction of rotation of the engine. This makes it possible to track well the evolution of the angular position when the engine is stopping.

4. Determination of the Absolute Angular Position of the Target, During a Phase of Restarting the Engine This step is performed during phases of restarting the engine when the module named "Track_Module" is considered to be initialized. To obtain an absolute position, the motor cycle is reconstructed from the high-resolution signal (TOP_FTTH) and the angular position is synchronized over the engine cycle.

This time the synchronization includes the following steps:
 i. Tooth Synchronization As soon as the engine begins to turn, the period of each tooth (TTH_PERIOD) is measured. In order to reject the probability of "falling" on a singularity (SING) during this step, account is taken of a plurality of consecutive periods.

ii. Sector Synchronization

This step is not necessary, because the number of the tooth identified in the step 3 is used in the next step.

iii. Cycle Synchronization

Cycle synchronization identifies the position over the sector, the current number of the sector and revolution. The number of the tooth identified in the step 3 is used for this. Following cycle synchronization, it is possible to supply valid "cycle_pos" information representing the absolute angular position of the engine over a cycle.

iv. Cycle Synchronization Verification

The standard synchronization mechanism is used to verify that the fast synchronization step has been performed correctly. In the event of non-conformance, it is considered that full synchronization has not been performed correctly and a standard synchronization is performed to reinitialize the system.

EXAMPLES

Figure 9:
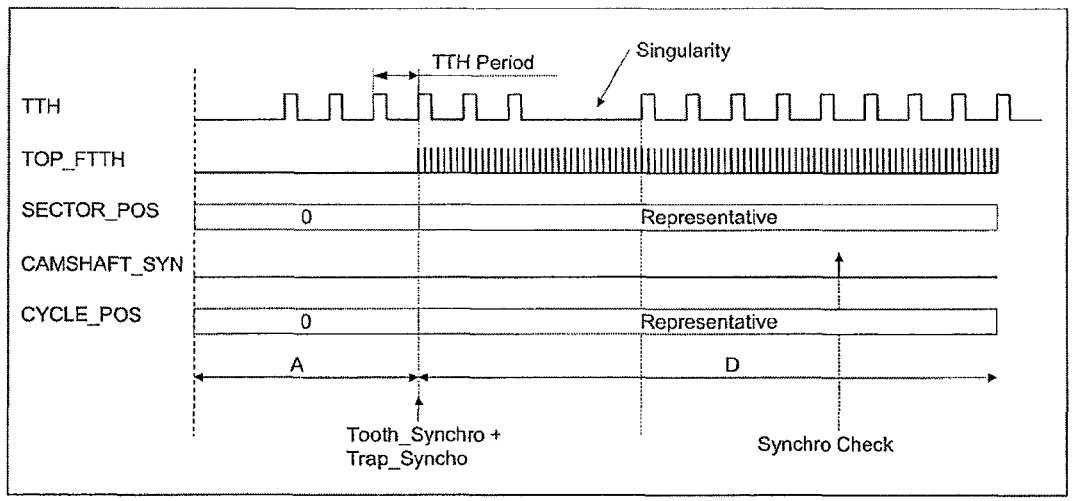
FIG. 9 shows the resulting improvement in the synchronization time relative to FIG. 1 in which the overall system is completely synchronized at the end of tooth synchronization, typically obtained after three crankshaft teeth (the phases B and C are no longer necessary).

FIG. 9 shows the improvement obtained in respect of the synchronization time compared to FIG. 1. The overall system is completely synchronized at the end of tooth synchronization, typically obtained after three crankshaft teeth (the phases B and C are no longer necessary).

Figure 10:
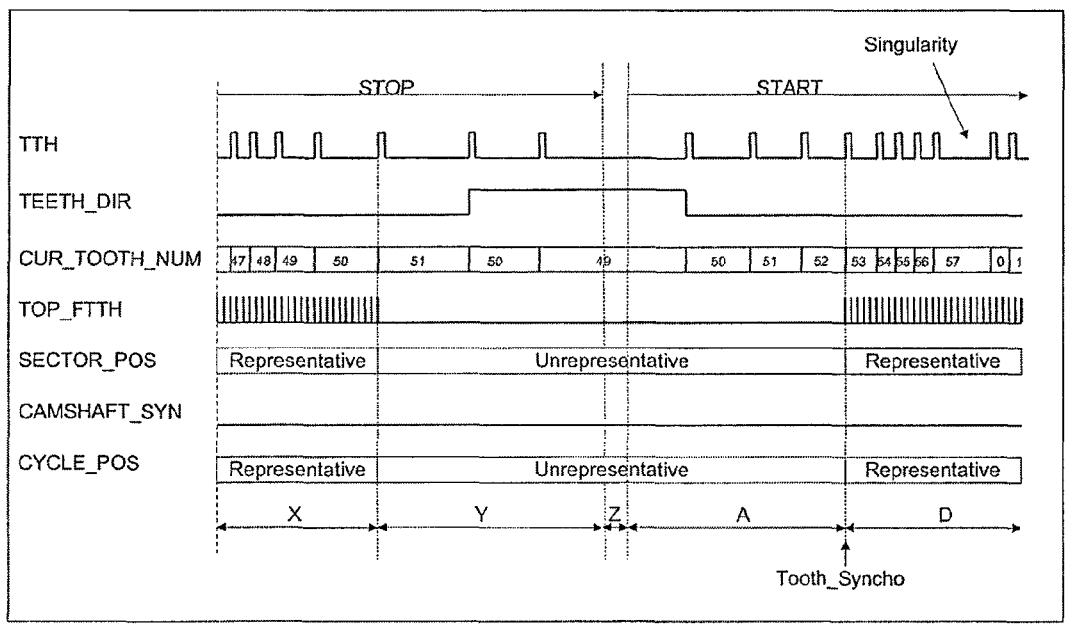
FIG. 10 shows how, on the basis of the value "Cur_Tooth_num" that continues to evolve during the phase of stopping the engine, the system is capable of synchronizing completely as soon as it has completed a tooth synchronization.

FIG. 10 shows how, on the basis of the value "Cur_Tooth_num" that continues to evolve during the phase of stopping the engine, the system can be synchronized completely as soon as a tooth synchronization has been performed. The various steps are as follows:

X: Stopping phase with system synchronized
Y: Stopping phase with system desynchronized with tracking of tooth position continuing
Z: Engine stopped
A: Tooth synchronization phase
D: System synchronized

The invention claimed is:

1. A method for determining an absolute angular position of a crankshaft target of an internal combustion engine including a plurality of teeth utilizing a sensor for acquiring at least one signal representing passage of each tooth in front of the sensor as a function of time, comprising:
   i. during running of the engine determining a period of a tooth while increasing angular resolution of the at least one signal by generating over the period a higher-resolution signal representing passage of fractions of each tooth in front of the sensor as a function of time and generating an absolute angular position from the signal and from the period;
   ii. during stopping the engine, when determination of the period is no longer possible, determining a number of teeth continuously passing in front of the sensor; and
   iii. during restarting the engine, using the determined number of the teeth to reduce a synchronization time to acquire the absolute angular position of the crankshaft target.

2. A method according to claim 1, wherein for step i, the absolute angular position is generated from the steps of:
   a. determining a position of at least one missing tooth on the target from the higher-resolution signal;
   b. determining a position of at least one sector from the position of the at least one missing tooth; and
   c. identifying among sectors of the target, a revolution number of a cycle and using counters to provide a synchronization.

3. A method according to claim 1 wherein for step i determining the period of the tooth from a period of a preceding tooth, from an internal measurement or from information from an external device.

4. A method according to claim 2 wherein for step i determining the period of the tooth from a period of a preceding tooth, from an internal measurement or from information from an external device.

5. A method according to claim 1, wherein the number of the identified tooth is initialized by determining position of at least one missing tooth on the target from the higher-resolution signal during a first phase of starting the engine.

6. A method according to claim 2, wherein the number of the identified tooth is initialized by determining position of at least one missing tooth on the target from the higher-resolution signal during a first phase of starting the engine.

7. A method according to claim 3, wherein the number of the identified tooth is initialized by determining position of at least one missing tooth on the target from the higher-resolution signal during a first phase of starting the engine.

8. A method according to claim 4, wherein the number of the identified tooth is initialized by determining position of at least one missing tooth on the target from the higher-resolution signal during a first phase of starting the engine.

9. A method according to claim 1, wherein for step iii an absolute angular position is generated by the steps of:
   (a) defining a tooth synchronization; and
   (b) identifying a sector and revolution number of the cycle from the number of the tooth identified in step ii.

10. A method according to claim 2, wherein for step iii an absolute angular position is generated by the steps of:
    (a) defining a tooth synchronization; and
    (b) identifying a sector and revolution number of the cycle from the number of the tooth identified in step ii.

11. A method according to claim 3, wherein for step iii an absolute angular position is generated by the steps of:
    (a) defining a tooth synchronization; and
    (b) identifying a sector and revolution number of the cycle from the number of the tooth identified in step ii.

12. A method according to claim 4, wherein for step iii an absolute angular position is generated by the steps of:
    (a) defining a tooth synchronization; and
    (b) identifying a sector and revolution number of the cycle from the number of the tooth identified in step ii.

13. A method according to claim 5, wherein for step iii an absolute angular position is generated by the steps of:
    (a) defining a tooth synchronization; and
    (b) identifying a sector and revolution number of the cycle from the number of the tooth identified in step ii.

14. A method according to claim 6, wherein for step iii an absolute angular position is generated by the steps of:
    (a) defining a tooth synchronization; and
    (b) identifying a sector and revolution number of the cycle from the number of the tooth identified in step ii.

15. A method according to claim 7, wherein for step iii an absolute angular position is generated by the steps of
    (a) defining a tooth synchronization; and
    (b) identifying a sector and revolution number of the cycle from the number of the tooth identified in step ii.

16. A method according to claim 8, wherein for step iii an absolute angular position is generated by the steps of:
    (a) defining a tooth synchronization; and
    (b) identifying a sector and revolution number of the cycle from the number of the tooth identified in step ii.

17. A method according to claim 9, wherein before step (a) performing the steps of:
    determining a position of at least one missing tooth on the target from the higher-resolution signal and a second tooth number deduced therefrom that is compared to the number of the tooth identified in step ii; and
    if the tooth numbers are not identical, the second tooth number is used, after which a value of the current tooth number is initialized.

18. A method according to claim 10, wherein before step (a) performing the steps of:
    determining a position of at least one missing tooth on the target from the higher-resolution signal and a second tooth number deduced therefrom that is compared to the number of the tooth identified in step ii; and
    if the tooth numbers are not identical, the second tooth number is used, after which a value of the current tooth number is initialized.

19. A method according to claim 11, wherein before step (a) performing the steps of:
  determining a position of at least one missing tooth on the target from the higher-resolution signal and a second tooth number deduced therefrom that is compared to the number of the tooth identified in step ii; and
  if the tooth numbers are not identical, the second tooth number is used, after which a value of the current tooth number is initialized.

20. A method according to claim 12, wherein before step (a) performing the steps of:
  determining a position of at least one missing tooth on the target from the higher-resolution signal and a second tooth number deduced therefrom that is compared to the number of the tooth identified in step ii; and
  if the tooth numbers are not identical, the second tooth number is used, after which a value of the current tooth number is initialized.

21. A method according to claim 13, wherein before step (a) performing the steps of:
  determining a position of at least one missing tooth on the target from the higher-resolution signal and a second tooth number deduced therefrom that is compared to the number of the tooth identified in step ii; and
  if the tooth numbers are not identical, the second tooth number is used, after which a value of the current tooth number is initialized.

22. A method according to claim 14, wherein before step (a) performing the steps of:
  determining a position of at least one missing tooth on the target from the higher-resolution signal and a second tooth number deduced therefrom that is compared to the number of the tooth identified in step ii; and
  if the tooth numbers are not identical, the second tooth number is used, after which a value of the current tooth number is initialized.

23. A method according to claim 15, wherein before step (a) performing the steps of:
  determining a position of at least one missing tooth on the target from the higher-resolution signal and a second tooth number deduced therefrom that is compared to the number of the tooth identified in step ii; and
  if the tooth numbers are not identical, the second tooth number is used, after which a value of the current tooth number is initialized.

24. A method according to claim 16, wherein before step (a) performing the steps of:
  determining a position of at least one missing tooth on the target from the higher-resolution signal and a second tooth number deduced therefrom that is compared to the number of the tooth identified in step ii; and
  if the tooth numbers are not identical, the second tooth number is used, after which a value of the current tooth number is initialized.

25. A method according to claim 1, comprising:
  using a signal provided by the sensor to indicate a direction of rotation to determine the number of the tooth passing in front of the sensor during the phase ii of stopping the engine.

26. A method according to claim 2, comprising:
  using a signal provided by the sensor to indicate a direction of rotation to determine the number of the tooth passing in front of the sensor during the phase ii of stopping the engine.

27. A method according to claim 3, comprising:
  using a signal provided by the sensor to indicate a direction of rotation to determine the number of the tooth passing in front of the sensor during the phase ii of stopping the engine.

28. A method according to claim 5, comprising:
  using a signal provided by the sensor to indicate a direction of rotation to determine the number of the tooth passing in front of the sensor during the phase ii of stopping the engine.

29. A method according to claim 9, comprising:
  using a signal provided by the sensor to indicate a direction of rotation to determine the number of the tooth passing in front of the sensor during the phase ii of stopping the engine.

30. A method according to claim 16, comprising:
  using a signal provided by the sensor to indicate a direction of rotation to determine the number of the tooth passing in front of the sensor during the phase ii of stopping the engine.

31. A method according to claim 1, wherein angular resolution of the signal is increased by interpolating the signal over each tooth period by use of the Bresenham algorithm.

32. A method according to claim 1, wherein:
  the signal is acquired in real time by a Hall-effect crankshaft sensor.

* * * * *